United States Patent
Park

(10) Patent No.: US 8,896,784 B2
(45) Date of Patent: Nov. 25, 2014

(54) LIQUID CRYSTAL DISPLAY DEVICE

(71) Applicant: LG Display Co., Ltd., Seoul (KR)

(72) Inventor: MinWoo Park, Daegu (KR)

(73) Assignee: LG Display Co., Ltd., Seoul (KR)

(*) Notice: Subject to any disclaimer, the term of this patent is extended or adjusted under 35 U.S.C. 154(b) by 203 days.

(21) Appl. No.: 13/676,251

(22) Filed: Nov. 14, 2012

(65) Prior Publication Data

US 2014/0009721 A1 Jan. 9, 2014

(30) Foreign Application Priority Data

Jul. 6, 2012 (KR) .................. 10-2012-0073616

(51) Int. Cl.
*G02F 1/1333* (2006.01)
*G02F 1/1335* (2006.01)

(52) U.S. Cl.
CPC ................. *G02F 1/133615* (2013.01)
USPC ............................. 349/58; 349/60

(58) Field of Classification Search
USPC ........................................... 349/58, 60
See application file for complete search history.

(56) References Cited

U.S. PATENT DOCUMENTS

| | | |
|---|---|---|
| 2003/0043569 A1 | 3/2003 | Mori et al. |
| 2007/0070646 A1 | 3/2007 | Morishita |
| 2008/0180972 A1 | 7/2008 | Sakamoto et al. |
| 2008/0297684 A1 | 12/2008 | Tanaka |
| 2008/0316771 A1 | 12/2008 | Mori et al. |
| 2009/0290381 A1 | 11/2009 | Liu et al. |

FOREIGN PATENT DOCUMENTS

| | | |
|---|---|---|
| DE | 203 04 342 U1 | 5/2003 |
| JP | 20003066448 A | 3/2003 |
| JP | 2007093957 A | 4/2007 |
| JP | 2008186780 A | 8/2008 |
| JP | 2008293902 A | 12/2008 |
| WO | 2009/102563 A1 | 8/2009 |

*Primary Examiner* — Phu Vu
(74) *Attorney, Agent, or Firm* — Morgan, Lewis & Bockius LLP

(57) ABSTRACT

A LCD is provided. The LCD device includes a cover bottom, a light guide panel, a liquid crystal panel, a LED assembly, a guide panel, and a case top. The light guide panel is disposed at the cover bottom. The liquid crystal panel is disposed over the light guide panel to display an image. The LED assembly is disposed at a lateral side of the light guide panel in the cover bottom to irradiate light to a side of the light guide panel. The guide panel guides the light guide panel and supporting the liquid crystal panel, a slide hole, into which the LED assembly is inserted, being formed in the guide panel. The slide hole cover covers the slide hole. The case top is coupled to the cover bottom, and surrounds a top of the liquid crystal panel.

11 Claims, 8 Drawing Sheets

LIQUID CRYSTAL DISPLAY DEVICE

CROSS-REFERENCE TO RELATED APPLICATIONS

This application claims the benefit of the Korean Patent Application No. 10-2012-0073616 filed on Jul. 6, 2012, which is hereby incorporated by reference as if fully set forth herein.

BACKGROUND

1. Field of the Invention

The present invention relates to a Liquid Crystal Display (LCD) device, and more particularly, to an edge type LCD device in which a light source unit including a plurality of light emitting diodes (LEDs) is disposed at a lateral side of a light guide panel.

2. Discussion of the Related Art

Active matrix type LCD devices use a thin film transistor as a switching element to display a moving image. The LCD devices are applied to a portable information device, office equipment, computer or the like as a display device, and also applied to a television.

Since the LCD devices cannot self-emit light, the LCD devices include a backlight unit disposed under a liquid crystal panel and display an image by using a light emitted from the backlight unit.

The LCD devices may be divided into an edge type and a direct type according to a scheme of the arrangement of a light source.

FIG. 1A is a perspective view illustrating a rear surface of a related art edge type LCD device and FIG. 1B is a sectional view taken along line B-B' of FIG. 1A. FIG. 1C is a detailed perspective view illustrating a portion A of FIG. 1A and illustrates a case top 12, in which a slide hole cover 18 covering a slide hole 19 of the LCD device shown in FIG. 1A is formed.

In the edge type LCD devices, as shown in FIGS. 1A to 1C, a light source 33 is disposed at a lateral side of a light guide panel 23 which is disposed under a liquid crystal panel 21. The edge type LCD devices replace side light emitted from the light source 33 into flat light by using the light guide panel 23, and irradiates the flat light on the liquid crystal panel 21. Therefore, the edge type LCD devices may decrease a thickness of the LCD devices. In FIG. 1B, a reference numeral '24' is a reflective plate adhered to a bottom of the light guide panel 23.

In the related art LCD device, a board including a Light Emitting Diode (LED) is adhered to a cover bottom for cooling of the LED. Therefore, it is impossible to replace the board. That is, if a life of the LED is finished, a back light unit including the LED has to be replaced.

However, because a LCD device applied to a game machine in an amusement arcade has to be continuously used with the light source being turned on for 24 hours, a life of a LED of the LCD device is shorter than that of a general LCD device. Therefore, in the LCD device applied to the game machine, a LED assembly 30, comprising a LED 33, a board 32 supporting the LED 33 and a support 31 in which the board is adhered, is interchangeably mounted inside a guide panel 16 and a cover bottom 11.

In the related art LCD device including the interchangeable LED assembly 30, as shown in FIG. 1C, a slide hole 19, through which the LED assembly 30 may be replaced, is covered by a slide hole cover 18 formed in a case top 12.

Therefore, when the LED 33 is replaced, after the case top 12 is removed, the LED assembly 30 has to be replaced. This makes a process of the replace inconvenient and a time of the replace long. In FIG. 1C, a reference numeral '17' denotes a Flexible Printed Circuit (FPC) connected to the board 32 of the LED assembly 30. The FPC electrically connects a main board to the LED assembly 30.

Also, in the related art LCD device, when the LED 33 is replaced, the case top 12 has to be necessarily removed. Therefore, a process of the replace is inefficient, a shape of the case top 12 may be easily replaced in the process of the replace and foreign matter may be inputted to the inside of the guide panel 16 or the cover bottom 11 in the process of the replace to cause a defect of the LCD device.

That is, in the related art LCD device in which the LED assembly 30 is interchangeable, the LED assembly 30 is slidingly inserted into the inside of the guide panel 16 or the cover bottom 11 to be assembled. Because the slide hole 19, through which the LED assembly 30 is slidingly inserted, is covered by the case top 12, when the LED assembly 30 is replaced, the case top 12 has to be removed.

Also, to solve the above-described limitation, a method of removing the slide hole cover 18, which is formed in the case top 12 and covers the slide hole, is proposed. However, in this case, light leakage may be generated through the slide hole 19 and foreign matter may come to the inside of the guide panel 18 or the cover bottom 11 to cause a defect of the LCD device. Therefore, effectively it is difficult to remove the slide hole cover 18.

SUMMARY

Accordingly, various embodiments provide a LCD device that substantially obviates one or more problems due to limitations and disadvantages of the related art.

Various embodiments provide a LCD device, in which a slide hole formed for replacing a LED assembly is covered by a slide hole cover that is formed separately from a case top.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In various embodiments, a liquid crystal display (LCD) device may include: a cover bottom; a light guide panel disposed at the cover bottom; a liquid crystal panel disposed over the light guide panel to display an image; a LED assembly receiving portion configured to receive a LED assembly disposed at a lateral side of the light guide panel in the cover bottom to irradiate light to a side of the light guide panel; a guide panel guiding the light guide panel and supporting the liquid crystal panel, a slide hole, into which the LED assembly is inserted, being formed in the guide panel; a slide hole cover covering the slide hole; and a case top coupled to the cover bottom, and surrounding a top of the liquid crystal panel; wherein the slide hole cover is configured to be releasable coupled to at least one of the case top, the guide panel and the cover bottom.

In various embodiments, the LCD device may further include the LED assembly being received in the LED assembly receiving portion.

In various embodiments, a cover bottom slide hole may have a size greater than or equal to the slide hole and may be formed in a portion corresponding to the slide hole in the cover bottom.

In various embodiments, a case top slide hole may have a size greater than or equal to the slide hole and may be formed in a portion corresponding to the slide hole in the case top.

In various embodiments, the LED assembly may include: a LED used as a light source; a board supporting the LED, a circuit for driving the LED being formed in the board; and a support, the board being mounted on the support.

In various embodiments, a handle protrudes from a portion exposed to outside the slide hole in the support.

In various embodiments, the slide hole cover is coupled to the cover bottom by a connecting part inserted through a connecting hole formed in the cover bottom.

In various embodiments, the slide hole cover may include a main body part formed in the same shape as an open surface of the slide hole, for covering the slide hole; and a fixing protrusion formed in a portion contacting the guide panel in the main body part and, and inserted into a fixing groove formed in the guide panel.

In various embodiments, an insert part is formed in the slide hole cover, wherein the insert part is formed in an inner surface of the main body part, a connecting part insert hole is formed in the insert part, and a connecting part is inserted into the connecting part insert hole through a connecting hole formed in the cover bottom to be coupled to the slide hole cover.

In various embodiments, a bending part bent from the main body part is formed in the slide hole cover, and the bending part contacts a portion which is formed in the guide panel and faces one lateral side of the liquid crystal panel.

In various embodiments, the a bending part guide protrusion, which is inserted into a guide groove formed in the guide panel, is formed in the bending part.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1A:
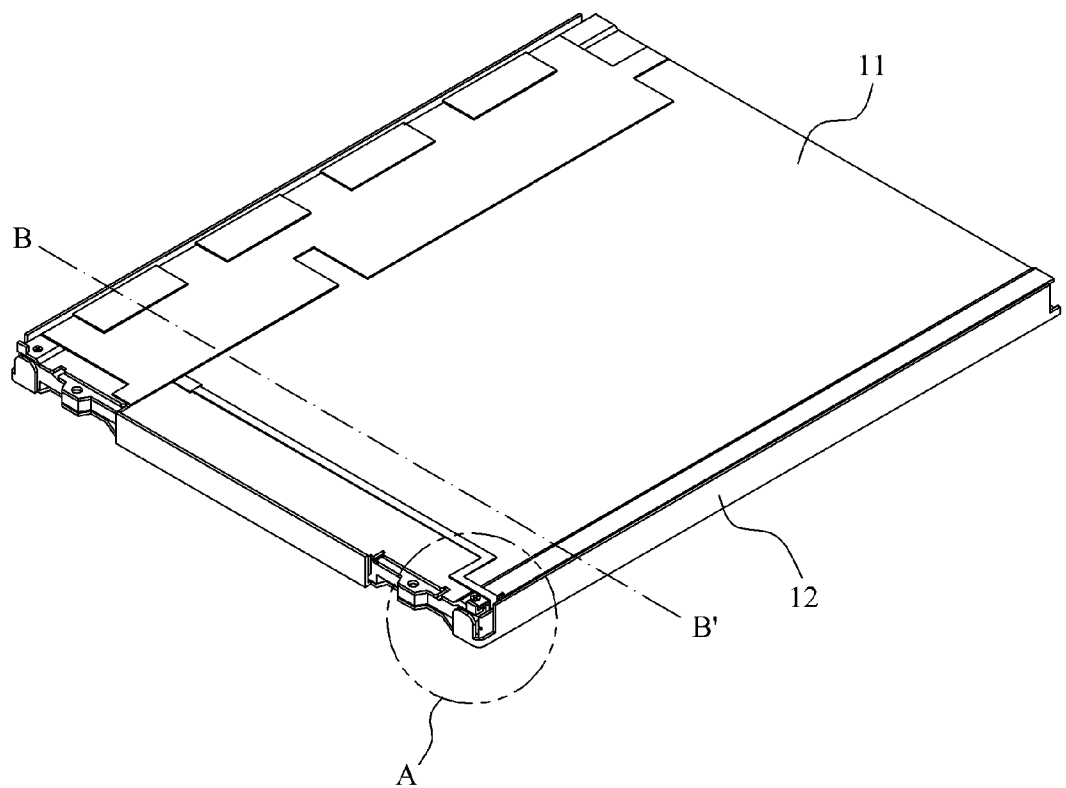
FIG. 1A is a perspective view illustrating a rear surface of a related art edge type LCD device.
Figure 1B:
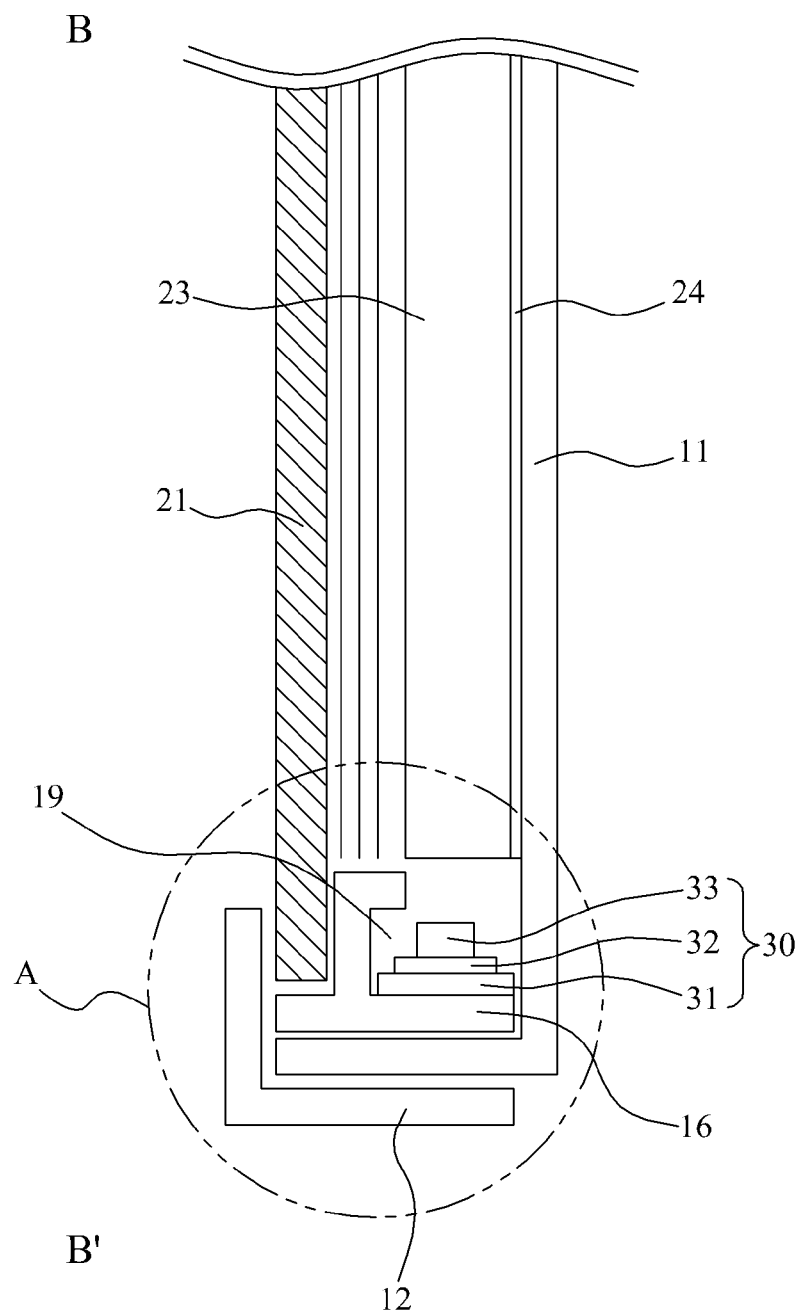
FIG. 1B is a sectional view taken along line B-B' of FIG. 1A.
Figure 1C:
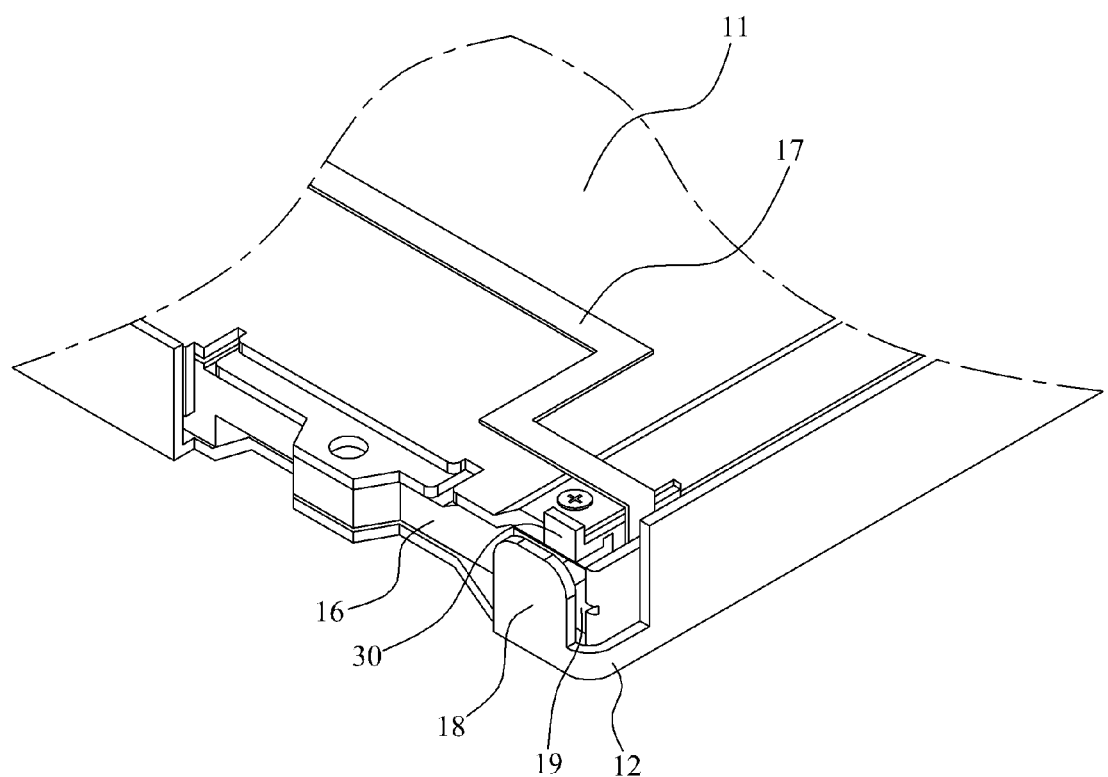
FIG. 1C is a detailed perspective view illustrating a portion A of FIG. 1A.
Figure 2:
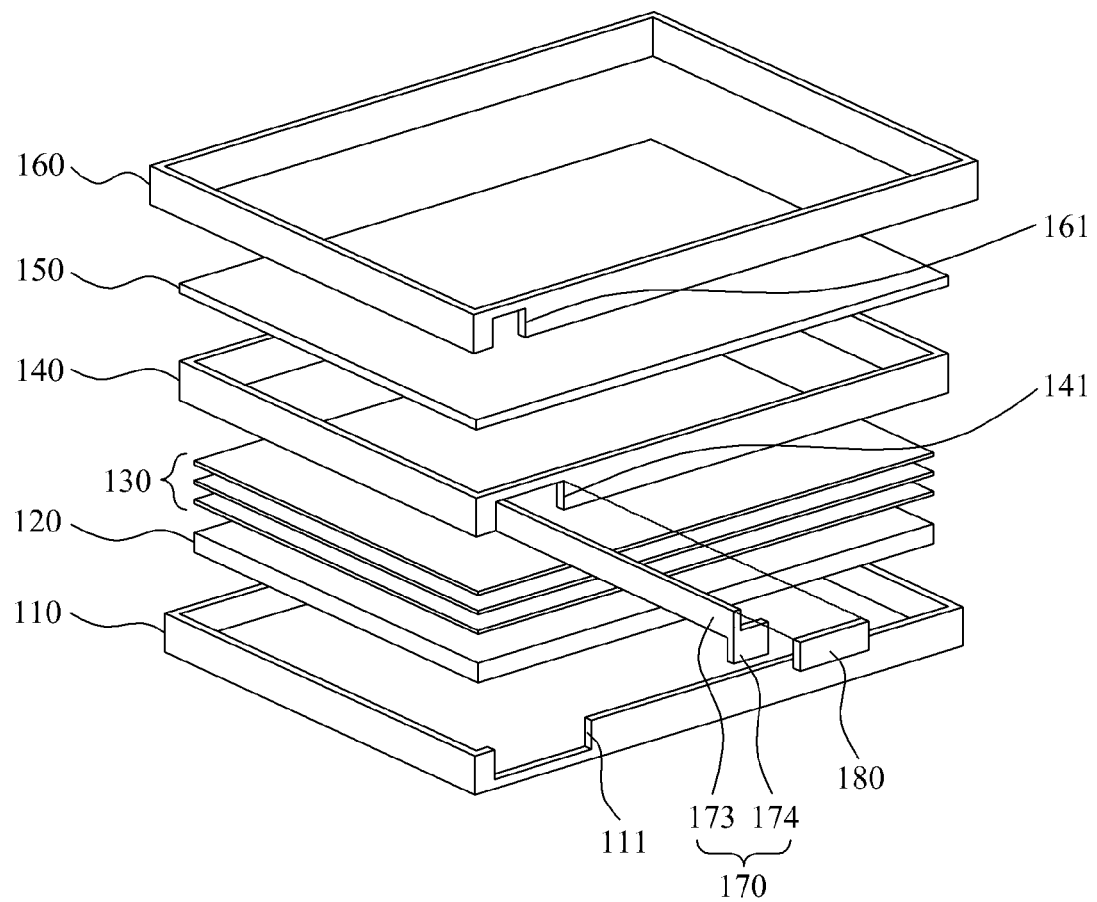
FIG. 2 is an exploded perspective view illustrating a configuration of a LCD device according to the present invention.
Figure 3:
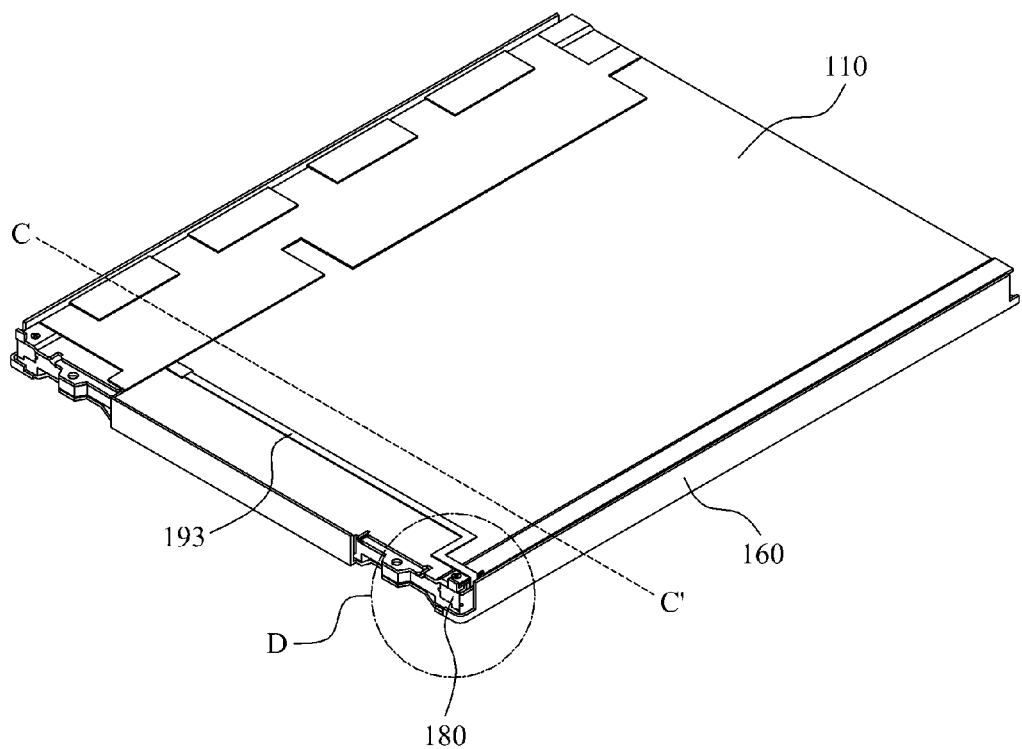
FIG. 3 is a perspective view illustrating a rear surface of the LCD device according to the present invention.
Figure 4:
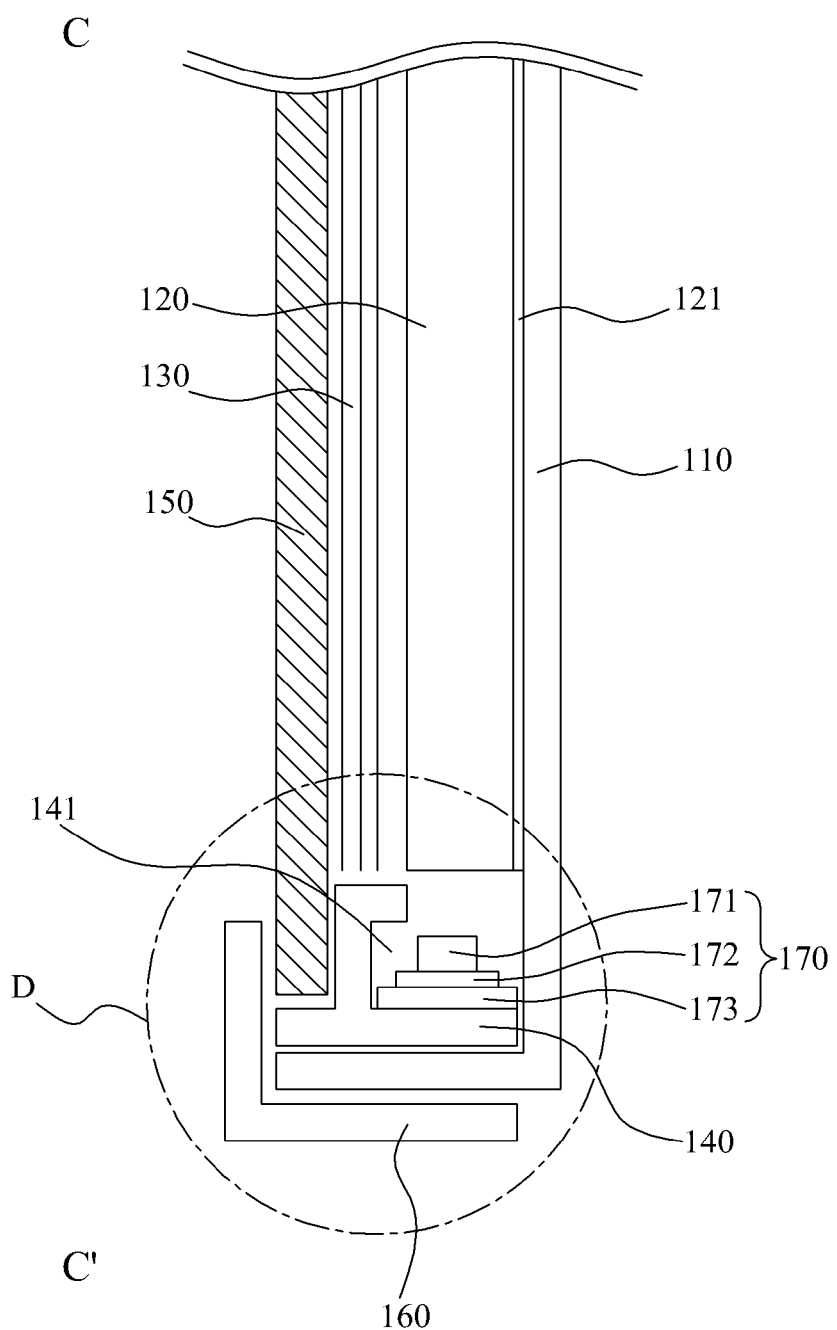
FIG. 4 is a sectional view taken along line C-C' of FIG. 3.
Figure 5:
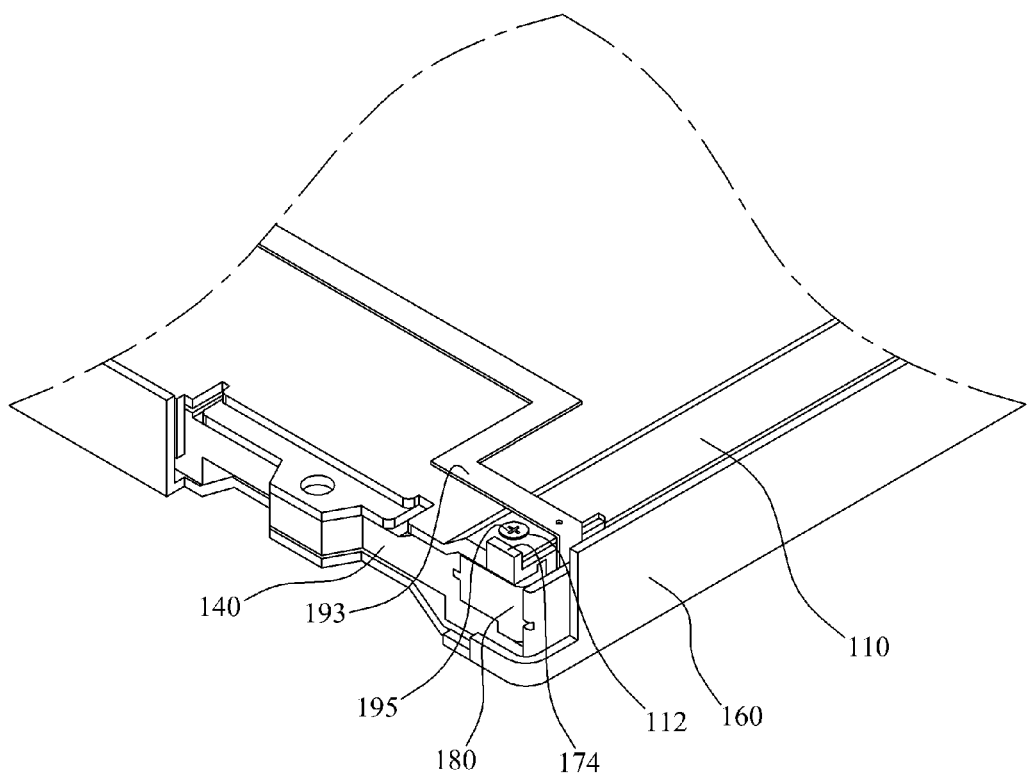
FIG. 5 is a perspective view illustrating a portion D of FIG. 3 in detail.
Figure 6:
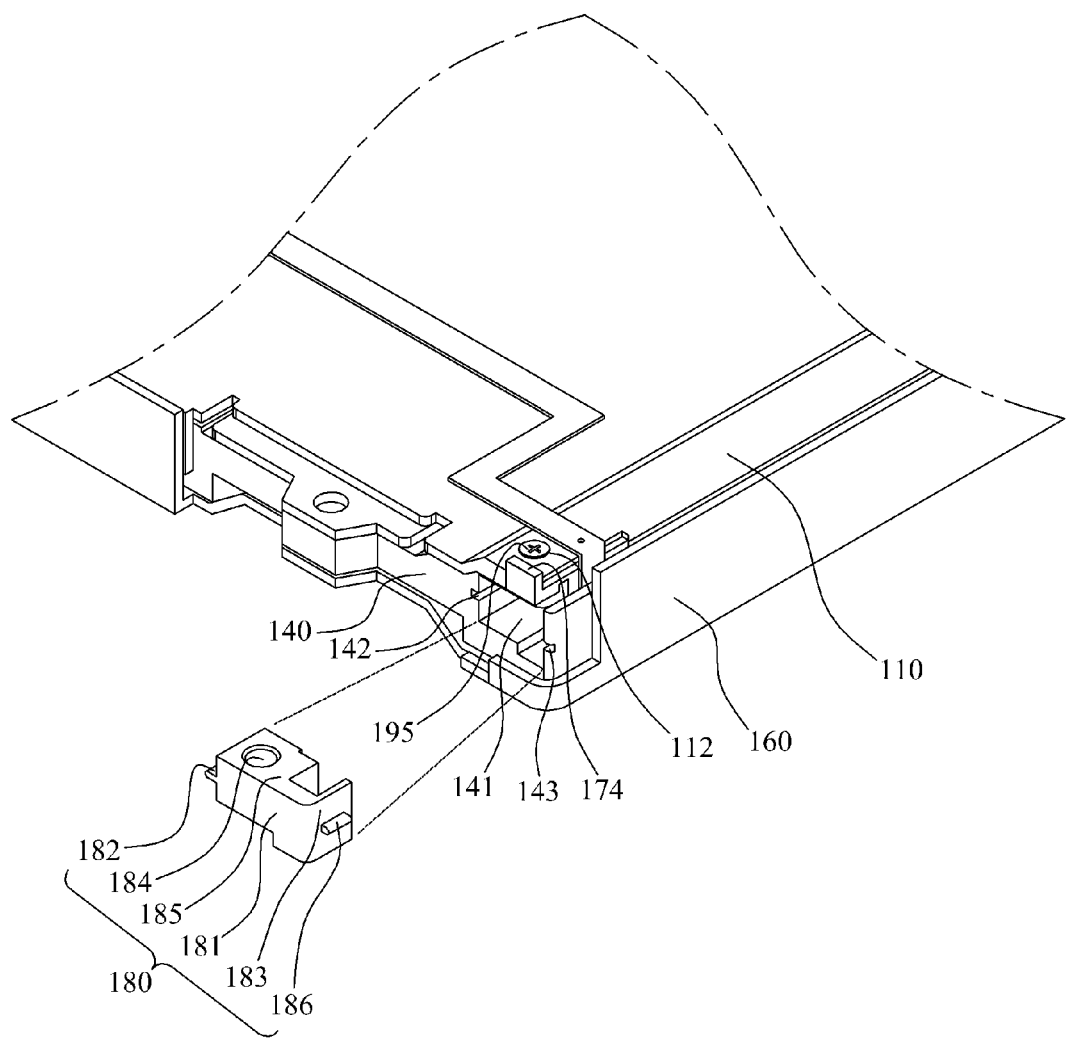
FIG. 6 is an exemplary diagram illustrating a slide hole cover separated from a slide hole of FIG. 5.

FIG. 2 is an exploded perspective view illustrating a configuration of a LCD device according to the present invention, FIG. 3 is a perspective view illustrating a rear surface of the LCD device according to the present invention, FIG. 4 is a sectional view taken along line C-C' of FIG. 3, FIG. 5 is a perspective view illustrating a portion D of FIG. 3 in detail and FIG. 6 is an exemplary diagram illustrating a slide hole cover separated from a slide hole of FIG. 5.

As shown in FIGS. 2 to 4, the LCD device according to the present invention includes a cover bottom 110, a light guide panel 120 disposed at the cover bottom 110, a liquid crystal panel 150 disposed over the light guide panel 120 to display an image, a LED assembly 170 disposed at a lateral side of the light guide panel 120 in the cover bottom 110 to emit light to the light guide panel 120, a guide panel 140 guiding the light guide panel 120 and supporting the liquid crystal panel 150, a slide hole (into which the LED assembly 170 is inserted) being formed in the guide panel 140, a slide hole cover 180 covering the slide hole 141, a case top 160 surrounding a top edge of the liquid crystal panel 150 and coupled to the cover bottom 110, an optical sheet part 130 including a plurality of optical films and a reflective plate 121 inserted between the light guide panel 120 and the cover bottom 110 to reflect light traveling to a bottom of the light guide panel 120 to a top of the light guide panel 120. In FIG. 3 and FIG. 5, a reference numeral '193' denotes a Flexible Printed Circuit (FPC) connected to the board 172 of the LED assembly 170. The FPC 193 electrically connects a main board to the LED assembly 30.

First, the cover bottom 110 is coupled to the case top 160, and the liquid crystal panel 150 and the above-described elements are built between the cover bottom 110 and the case top 160.

In the lowest portion of the cover bottom 110, the reflective plate 121 is stacked. Also, the light guide 120, the optical sheet part 130 and the liquid crystal panel 150 is sequentially stacked over the reflective plate 121.

Particularly, the present invention relates to an edge type LCD device, and therefore, the LED assembly 170 including LEDs 171 used as a light source is disposed at a lateral side in the cover bottom 110.

The LED assembly 170 is disposed between a lateral side of the cover bottom 110 and one of the four lateral sides other than a top side and a bottom side among the sides of the light guide panel 120. Here, the top side of the light guide panel 120 contacts the optical sheet part 130 and the bottom side of the light guide panel 120 contacts the reflective plate 121.

In this case, the LED assembly 170 is substantially inserted into a slide hole 141, which is formed in the guide panel 140 mounted on the cover bottom 110, to be disposed at the cover bottom 100.

A cover bottom slide hole 111 is formed in a portion which is formed in the lateral side of the cover bottom 110 and corresponds to the slide hole 141. Here, a size of the cover bottom slide hole 111 is equal to or greater than that of the slide hole 141.

As described above, the cover bottom 110 is coupled to the case top 160 to include the built-in elements. To freely insert the LED assembly 170 into the guide panel 140 or freely take the LED assembly 170 out of the guide panel 140 through the slide hole 141 formed in the guide panel 140, the cover bottom slide hole 111 corresponding to the slide hole 141 has to be formed in the cover bottom 100.

However, instead of a hole type, the cover bottom slide hole 111 may be provided in a type where a portion of the lateral side of the cover bottom 110 is removed. That is, because the lateral sides of the cover bottom 110 overall surrounds a lateral side of the guide panel 140 in structure, even if a portion of the lateral side of the cover bottom 110 is removed, a performance of the cover bottom 110 is not degraded.

Therefore, the slide hole 141 may be exposed to the outside by removing the portion of the lateral side of the cover bottom 110. Here, the portion corresponds to the slide hole 141.

The light guide panel 120 diffuses and reflects light emitted from the LED 171 to transmit the light to the liquid crystal panel 150. The light guide panel 120 is formed of a resin such as polymethyl methacrylate PMMA.

The liquid crystal panel 150 drives liquid crystal injected between an array substrate and a color filter substrate by a voltage applied to the array substrate, and outputs an image by controlling a transmission amount of light emitted from the LED 171 mounted in the LED assembly 170.

The LED assembly 170 emits light to the liquid crystal panel 150 through the light guide panel 120. The LED assembly 170 includes a LED 171 used as a light source, a board 172 supporting the LED 171 and a support 173 in which the board 172 is mounted. Here, a circuit for driving the LED 171 is formed in the board 172. However, the board 172 may be formed to perform a function of the support 173.

A handle 174 protrudes from a portion which is formed in the support 173 and is exposed to the outside of the slide hole 141. A user holds the handle 174 to insert the LED assembly 170 in the slide hole 141 or take the LED assembly 170 out of the slide hole 141.

The LED assembly 170 applied to the present invention is disposed inside the LCD device for the purpose of replacing the LED 171 when a life of the LED 171 is shortened by a frequent use.

When the assembly 170 is replaced, a user can hold the handle 174 to insert the LED assembly 170 into the slide hole 141 or take the LED assembly 170 out of the slide hole 141.

The guide panel 140 guides the light guide panel 120 and supports the liquid crystal panel 150.

The guide panel 140, as shown in FIG. 2, may be formed in a square-shaped frame. Therefore, the reflective plate 121, the light guide panel 120 and the optical sheet part 130 built in the guide panel 140 is guided by the lateral sides of the guide panel 140 to be fixed at a certain position.

The slide hole 141, in which the LED assembly 170 may be inserted to be fixed, is formed in one of the lateral sides of the guide panel 140. The LED assembly 170 is driven in such a state that the LED assembly 170 is inserted into the slide hole 141, thereby emitting light to the lateral side of the light guide panel 120.

The case top 160 is coupled to the cover bottom 110, and the liquid crystal panel 150 and the above-described elements are built between the case top 160 and the cover bottom 110.

The case top 160 surrounds a top edge of the liquid crystal panel 150, and light transmitted from the liquid crystal 150 is outputted to the outside through an open center portion of the case top 160.

Recently, to satisfy consumers' demand, a LCD device including a borderless type case top is developed and sold. A borderless type LCD device may be divided into two types. In one type, a step height between the liquid crystal panel 150 and the case top 160 is not formed on planes of the liquid crystal panel 150. In the other type, a case top 160 exposed to the plane of the liquid crystal panel 150 has a very narrow width.

The case top slide hole 161 is formed in a portion which is formed in the case top 160 and corresponds to the slide hole 141 formed in the guide panel 140. Here, a size of the case top slide hole 161 is equal to or greater than that of the slide hole 141. As described above, the case top 160 is coupled to the cover bottom 110, and the liquid crystal panel 150 and the above-described elements are built between the cover bottom 110 and the case top 160. To freely insert the LED assembly 170 into the guide panel 140 or freely take the LED assembly 170 out of the guide panel 140 through the slide hole 141 formed in the guide panel 140, the case top slide hole 161 corresponding to the slide hole 141 has to be formed in the case top 160.

However, instead of a hole type, the case top slide hole 161 may be provided in a type where a portion of the lateral side of the case top 160 is removed. That is, because lateral sides of the case top 160 overall surrounds a lateral side of the guide panel 140 in structure, even if a portion of the lateral side of the case top 160 is removed, a performance of the cover bottom 110 is not degraded.

Therefore, the slide hole 141 may be exposed to the outside by removing a portion of the lateral side of the case top 160. Here, the portion corresponds to the slide hole 141.

The optical sheet part 130 diffuses light transmitted through the light guide panel 120 or allows the light transmitted through the light guide panel 120 to be vertically incident on the liquid crystal panel 150. The optical sheet part 130 may include a diffuser sheet, a prism sheet, etc. and be formed variously. Also, although not shown, a polarizing film may be attached to a plane or a bottom of the liquid crystal panel 150. The polarizing films transmit only desired directional light among the light transmitted through the light guide panel 120.

The reflective plate 121 is positioned under the light guide panel 120, namely, at the lowest portion of the cover bottom 110. The reflective plate 121 reflects light traveling to a bottom of the light guide panel 120 toward the liquid crystal panel 150 over the light guide panel 120. That is, the light, which is emitted from the LED 171 mounted in the LED assembly 170 and is then incident on the light guide panel 120, is refracted by a pattern on the light guide panel 120 to be reflected toward the liquid crystal panel 150. However, there may be the light discharged to the external through the lower surface of the light guide panel without being reflected. In this case, the reflective plate 121 re-reflects the light toward the panel.

Finally, the slide hole cover 180 is inserted into the slide hole 141 formed in a lateral side of the guide panel 140 to prevent foreign matter from coming to the inside of the slide hole 141 and prevent light emitted from the LED 171 disposed in the slide hole 141 from leaking to the outside of the slide hole 141.

As described above, the guide panel 140 is mounted between the case top 160 and the cover bottom 110 by coupling the case top 160 to the cover bottom 110. After the case top 160 and the cover bottom 110 is coupled together, the slide hole 141 is exposed to the outside of the LCD device through the case top slide hole 161 formed in the case top 160 and the cover bottom slide hole 111 formed in the cover bottom 110.

Therefore, if the LCD device is used without the slide hole cover 180, foreign matter may come to the inside of the guide panel 140 through the open slide hole 141. In this case, the foreign matter may contact an electric wire on the board 172 to cause a defect of electric contact. Also, the foreign matter may be stacked on the surface of the LED 171, the light guide panel 120 or the like to degrade the brightness of the LED 171.

To prevent this phenomenon from occurring, in the present invention, an open surface of the slide hole 141 is covered with the slide hole cover 180.

The slide hole cover 180 includes a main body part 181 formed in the same shape of the open surface of the slide hole 141 for covering the slide hole 141, and a fixing protrusion 182 formed in a portion, which is formed in the main body part 181 and contacts the guide panel 140, and inserted into a fixing groove 142 formed in the guide panel 140.

The main body part 181 is formed in a solid figure whose shape is the same as that of the open surface of the slide hole 141. Also, the fixing protrusion 182 is formed in a lateral side of the main body part 181. The fixing protrusion 182 is inserted into the fixing groove 142 formed in the guide panel 140 contacting the main body part 181, and assists the main body part 181 to be inserted into the slide hole 141. That is, the fixing protrusion 182 guides the main body part 181 to smoothly insert the main body part into the slide hole 141.

An insert part 185, in which a connecting part insert hole 184 is formed, is formed in an inner surface of the main body part 181. Also, a connecting part 195 is inserted into the connecting part insert hole 184 through a connecting hole 112 formed in the cover bottom 110 to be coupled to the slide hole cover 180.

That is, the slide hole cover 180 is coupled to the cover bottom 110 by the connecting part 195. For this end, the insert part 185 is formed in an inner surface of the main body part 181. The insert part 185 is inserted into the inside of the open surface of the slide hole 141 and is not exposed to the outside. Also, because the connecting part insert hole 184 is formed in the insert part 185, the connecting part 195 may be coupled to the insert part 185.

Therefore, a user who wants to replace the LED assembly 170 may separate the connecting part 195 from the connecting hole 112 to separate the slide hole cover 180 from the slide hole 141 with the case top 160 being not separated from the cover bottom 110. Here, the connecting part 195 is coupled to the connecting hole 112 formed in the surface of the cover bottom 110 and is formed in the screw shape.

A bending part 183 bent from the main body part 181 is formed in the slide hole cover 180, and the bending part 183 contacts a portion, which is formed in the guide panel 140 and is facing one lateral side of the liquid crystal panel.

When the connecting part 195 is inserted into the connecting part insert hole 184 formed in the insert part 185 of the slide hole cover 180 to couple the slide hole cover 180 to cover bottom 110, the bending part 183 prevents the slide hole cover 180 from being twisted. That is, if the bending part 183 is not formed in the slide hole cover 180, when the connecting part 195 is rotated in the connecting part insert hole 184, the insert part 185 is twisted in the open surface and the main body part 181 is twisted in the open surface, too.

If the surface of the main body part 181 is twisted in the open surface of the guide panel 140, and thus, a portion of the surface of the main body part 181 is protrudes from the open surface of the guide panel 140, the LCD device may not be coupled to a case cover of electronic products such as TV, portable phones or the like due to the protruded portion of the main body part 181.

That is, because the gap between the lateral side of the guide panel 140 and the case cover is lower than several mm or 1 mm, the LCD device may not be coupled to the case cover because of the twist of the main body part 181.

To prevent the LCD device from not being coupled to the case cover because of the twist of the main body part 181, the slide hole cover 180 includes the bending part 183 formed in a lateral side of the main body part 181. When the connecting part 195 is inserted into the connecting part insert hole 184 and rotated, the bending part 183 contacts the guide panel 140 to prevent the main body part 181 from rotating together with the connecting part 195.

By the above-described function, the main body part 181 may not rotate and not be twisted, and thus, the surface of the main body part 181 exposed to the outside of the open surface and the lateral side of the guide panel 140 do not have a step height, and form a plane. Therefore, because an unnecessary protrusion is not formed in the lateral side of the LCD display, the LCD display may be normally coupled to the case cover.

A bending part guide protrusion 186, which is inserted into a guide groove 143 formed in the lateral side of the guide panel 140, is formed in the bending part 183. The bending part guide protrusion 186 guides the bending part 183 inserted into the open surface of the slide hole 141 to smoothly insert the bending part 183 in the slide hole 141.

A summary on the features of the present invention will now be described.

The LCD device according to the present invention is applied to the electronic products, replace interval of which is short. An object of the present invention is for a user to easily replace the LED assembly 170 including the LED 171.

Conventionally, to replace a LED assembly in a LCD device assembled to a complete product, a case top has to be completely separated from the LCD device. Therefore, when the LED assembly is replaced, inconvenience is caused to a user and a replace of the shape of the case top occurs.

To solve this limitation, in the present invention, a portion, which is formed in the lateral side of the case top 160 and covers the slide hole 141 formed in the guide panel 140 for the LED assembly to be slidingly inserted therein, is removed. Moreover, the slide hole cover 180 covers the open surface of the slide hole 141.

By using the slide hole cover 180, a user may easily replace the LED assembly 170, light leakage may be prevented and foreign matter may be prevented from coming to the open surface of the slide hole 141.

According to the embodiments of the present invention, the slide hole formed for replacing a LED assembly is covered by a slide hole cover that is formed separately from a case top, thus enabling the LED assembly to be easily replaced.

Moreover, in the present invention, the slide hole cover covers the slide hole, and thus, light leakage can be prevented and foreign matter can be prevented from penetrating into the LCD device.

It is to be noted that the slide hole cover may have any other shape which may be suitable. Furthermore, the slide hole cover may be fixed to the cover bottom by means of a different fixing mechanism than by using a screw. By way of example, the slide hole cover may be clamped to the cover bottom. As another alternative, the slide hole cover may be fixed to the cover bottom by means of one or more rivets.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display (LCD) device, comprising:
a cover bottom;

a light guide panel disposed at the cover bottom;

a liquid crystal panel disposed over the light guide panel to display an image;

a LED assembly receiving portion configured to receive a LED assembly disposed at a lateral side of the light guide panel in the cover bottom to irradiate light to a side of the light guide panel;

a guide panel guiding the light guide panel and supporting the liquid crystal panel, a slide hole, into which the LED assembly is inserted, being formed in the guide panel;

a slide hole cover covering the slide hole; and a case top coupled to the cover bottom, and surrounding a top of the liquid crystal panel;

wherein the slide hole cover is configured to be releasable coupled to at least one of the case top, the guide panel and the cover bottom.

2. The LCD device of claim 1, further comprising the LED assembly being received in the LED assembly receiving portion.

3. The LCD device of claims 1, wherein a cover bottom slide hole having a size greater than or equal to the slide hole is formed in a portion corresponding to the slide hole in the cover bottom.

4. The LCD device of claims 1, wherein a case top slide hole having a size greater than or equal to the slide hole is formed in a portion corresponding to the slide hole in the case top.

5. The LCD device of claim 1, wherein the LED assembly comprises:

a LED used as a light source;

a board supporting the LED, a circuit for driving the LED being formed in the board; and a support, the board being mounted on the support.

6. The LCD device of claim 5, wherein a handle protrudes from a portion exposed to outside the slide hole in the support.

7. The LCD device of claim 1, wherein the slide hole cover is coupled to the cover bottom by a connecting part inserted through a connecting hole formed in the cover bottom.

8. The LCD device of claim 1, wherein the slide hole cover comprises:

a main body part formed in the same shape as an open surface of the slide hole, for covering the slide hole; and a fixing protrusion formed in a portion contacting the guide panel in the main body part and, and inserted into a fixing groove formed in the guide panel.

9. The LCD device of claim 8, wherein an insert part is formed in the slide hole cover, the insert part is formed in an inner surface of the main body part, a connecting part insert hole is formed in the insert part, and a connecting part is inserted into the connecting part insert hole through a connecting hole formed in the cover bottom to be coupled to the slide hole cover.

10. The LCD device of claim 9, wherein a bending part bent from the main body part is formed in the slide hole cover, and the bending part contacts a portion which is formed in the guide panel and faces one lateral side of the liquid crystal panel.

11. The LCD device of claim 10, wherein a bending part guide protrusion, which is inserted into a guide groove formed in the guide panel, is formed in the bending part.

\* \* \* \* \*